(12) United States Patent
Matsumoto et al.

(10) Patent No.: US 7,185,055 B2
(45) Date of Patent: Feb. 27, 2007

(54) CHAT SYSTEM AND RECORD MEDIUM READABLE BY CHAT SYSTEM

(75) Inventors: Yasuhide Matsumoto, Kawasaki (JP); Masahiko Murakami, Kawasaki (JP); Sumiyo Okada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 742 days.

(21) Appl. No.: 09/804,246

(22) Filed: Mar. 13, 2001

(65) Prior Publication Data

US 2002/0023128 A1   Feb. 21, 2002

(30) Foreign Application Priority Data

Aug. 21, 2000   (JP) ............... 2000-250135

(51) Int. Cl.
*G06F 15/16* (2006.01)
(52) U.S. Cl. .................... 709/204; 205/217
(58) Field of Classification Search ........ 709/204–206, 709/217–219, 227, 230
See application file for complete search history.

(56) References Cited

U.S. PATENT DOCUMENTS

| | | | | |
|---|---|---|---|---|
| 5,764,916 A * | 6/1998 | Busey et al. | ................ | 709/227 |
| 5,828,839 A * | 10/1998 | Moncreiff | ................ | 709/204 |
| 5,987,503 A * | 11/1999 | Murakami | ................ | 709/204 |
| 6,212,548 B1 * | 4/2001 | DeSimone et al. | ........ | 709/204 |
| 6,345,290 B2 * | 2/2002 | Okada et al. | ................ | 709/204 |
| 6,370,563 B2 * | 4/2002 | Murakami et al. | .......... | 709/205 |
| 6,393,461 B1 * | 5/2002 | Okada et al. | ................ | 709/204 |
| 6,417,819 B1 * | 7/2002 | Matsumoto et al. | ......... | 345/1.1 |
| 6,434,604 B1 * | 8/2002 | Harada et al. | .............. | 709/207 |
| 6,446,112 B1 * | 9/2002 | Bunney et al. | ............. | 709/204 |
| 6,463,533 B1 * | 10/2002 | Calamera et al. | ........... | 713/163 |
| 6,480,885 B1 * | 11/2002 | Olivier | ...................... | 709/207 |
| 6,487,584 B1 * | 11/2002 | Bunney | ...................... | 709/206 |
| 6,684,248 B1 * | 1/2004 | Janacek et al. | ............. | 709/225 |

OTHER PUBLICATIONS

RFC 1413, Feb. 1993.*
Patent Abstracts of Japan of JP 11-203227 dated Jul. 30, 1999.
Internet Relay Chat Protocol, J. Oikarinen and D. Reed, May 1993, pp. 1-61, http://www.ietf.org/rfc/rfc1459.txt.

* cited by examiner

*Primary Examiner*—Krisna Lim
*Assistant Examiner*—Yasin Barqadle
(74) *Attorney, Agent, or Firm*—Staas & Halsey LLP

(57) ABSTRACT

A server and plural terminal devices form a network. Messages are transferred among the terminal devices via a plurality of virtual communication spaces formed on the network. The transmitted and received messages are displayed on a display device of each terminal device together with the message sender identifying information. The identifiers of members utilizing the virtual communication spaces and character-train information corresponding to the respective identifiers are stored in a display name management table. When an identifier and a message are sent from a terminal device, the server converts the identifier into a character train by means of the display name management table and sends the character train to the terminal devices.

29 Claims, 9 Drawing Sheets

22a

| Speaker ID | Channel | Display Name |
|---|---|---|
| ID1 |  | Name1 |
| ID2 | #channel1 | Name2 |
| ID2 | #channel2 | Name3 |
| ID2 | ID1 | Name4 |
| ⋮ | ⋮ | ⋮ |

FIG. 3B

| Row No. | SpeakerID | Time | Message |
|---|---|---|---|
| 1 | ID1 | 10:20 | Speech 1 |
| 2 | ID2 | 11:03 | Speech 2 |
| ----- | ----- | ----- | ----- |

CHAT SYSTEM AND RECORD MEDIUM READABLE BY CHAT SYSTEM

This invention relates to a chat system and, more particularly, to indication of message senders in a chat system.

BACKGROUND OF THE INVENTION

Internet relay chat (IRC) is a chat system which enables text-based simultaneous chatting among a number of people. In the Internet relay chat, a network is formed of a server and a plurality of terminal devices. A message from one terminal device is transmitted via the server to the respective terminal devices and is displayed on a display device each terminal device has. An identifier is assigned to each member or participant, and the identifier is displayed, being associated with the message from that participant displayed on each display device so that the chat participants can know who sent that message.

In a chat system, it sometimes occurs that plural conversations take place in parallel in plural virtual spaces. In such a case, too, identifiers are used in the respective virtual spaces. The identifiers can be set by the respective chat members, and, frequently, the same identifier is used in different virtual spaces, which sometimes causes troubles. Let an example be assumed, in which a company has set up a virtual space for dealing with customers' needs (hereinafter referred to as customer virtual space). When one of the company's customers asks one of the company employees a question about something, the customer's identifier, which the customer usually uses, is displayed on the display device of the company employee together with the content of the question or message. Similarly, the employee's identifier is displayed with the answer or message sent to the customer.

In this case, the identifier of the customer being displayed with the message gives more information than the information that the member sent that message is one of the company's customers.

In other case in which plural customers and plural employees are chatting in this customer virtual space, a customer might not be able to know who is the company employ he or she wants to chat with and, therefore, might ask a question to another customer wrongly.

Also, an employee may chat with another employee in a virtual space for use in arrangements among the employees (hereinafter referred to as employee virtual space), in parallel with the chatting with a customer in the customer virtual space. In such a case, there is a possibility that the employee, while intending to chat in the virtual space for the customers, might chat in the employee virtual space, or that the employee might send a message, which should be sent to another employee in the employee virtual space, to the customer who the employee is chatting in the customer virtual space, which resulting in undesirable leakage of inside information in the customer virtual space.

The displaying of an identifier in a chat results in disclosure of private information of a speaker or message sender. Some participants may not want it, in particular, when an unspecified number of people participate in the chat.

Discussions may be held through a chat system. What are talking on line in the chat are time-sequentially displayed on the display device of each terminal device. However, it is difficult to grasp the trend of the opinion of each speaker at a time by looking at such display.

An object of the present invention is to solve the above-described problems in a chat system by converting an identifier displayed with a message into a character string of other form.

SUMMARY OF THE INVENTION

A chat system according to the present invention includes a plurality of terminal devices, which form a network. Messages can be transmitted and received to and from the respective terminal devices via one of a plurality of virtual communication spaces formed on the network. Each terminal device has display means, on which messages transmitted and received are displayed with speaker identifying information. Table means is provided, in which identifiers of members or participants who utilize the chat system and character-string information corresponding to each identifier are stored. If a server is provided, the table means may or may not be provided in the server, or whether or not a server is used, it may be provided in each terminal device. In the chat system according to the present invention, the character-string information is used as the participant identifying information.

In the chat system described herein, participants' identifiers are not used as information for identifying the participants, but, instead, character-string information is used as speaker identifying information. Therefore, instead of identifiers, character-string information is displayed on display means.

A record medium readable in each of the terminal devices includes table means storing therein identifiers of members or participants in each of the virtual communication spaces. The record medium also includes search means for searching the table means for character-string information corresponding to the identifier of a speaker when he or she speaks and outputting the derived character-string information as the speaker identifying information for transmission with the speaker's message.

When this record medium is read at each terminal device, the search means reads, from the table means for character-string information corresponding to the identifier of the person who is going to send a message, and the read out character-string information is transmitted with the message. Thus, the character string, in stead of the sender's identifier, is display together with the transmitted message at the other terminal devices.

The search means of the record medium readable in each terminal device may be so arranged as to search the table means for character-train information and output the character-train information for display on the display means, as the sender identifier.

Thus, when the record medium is read at each terminal device, the search means, on receiving a message sent together with the sender's identifier, searches the table means for the character-string information corresponding to the sender's identifier and outputs it for display on the display means as the sender identifying information. Thus, in stead of the sender's identifier, the corresponding character string is displayed on each display device.

When a server is included in the network, a record medium the server can read includes table means for storing identifiers of participants in the chat and character-string information corresponding to the respective ones of the identifiers. The record medium further includes converting means for searching the table means for character-string information corresponding to the sender's identifier transmitted with a message by a particular participant or sender and outputting the character-string information for transmitting it with the message into a given one of the virtual communication spaces.

When the server reads the record medium, a sender's identifier sent with a message from a terminal device is converted to corresponding character-string information and forwarded to other terminals devices. Therefore, the character string, in stead of the sender's identifier, is displayed together with the sender's message on the display device of each terminal device.

Because a character string is display in stead of a message-sender's identifier, the same one speaker can be indicated by different character strings for different virtual spaces, or different character strings can be used and displayed for different receivers.

A chat system according to another aspect of the present invention includes a plurality of terminal devices, a memory in which stored are messages in association with sender identifiers, and converting means for converting a specified one of the senders identifiers stored in the memory to a predetermined character string for display on display means at each terminal device. The memory and converting means may be disposed in a server if it forms the network with terminal devices, or may be provided in each of the terminal devices. Alternatively, the memory can be disposed in the server, while the converting means is provided in each of the terminal devices. If the network does not include a server, the memory and the converting means are provided in each of the terminal devices.

According to this aspect of the present invention, a desired one of the senders identifiers displayed in association with messages displayed on the display means can be converted into a predetermined character string. Accordingly, by the selection of a desired one of the character strings, the trend of the opinion, for example, of each speaker or message sender can be known.

BRIEF DESCRIPTION OF THE DRAWINGS

FIG. 3B is a modified version of the display name management table of FIG. 3A;

FIG. 7 illustrates a speech log management table useable in a chat system according to a second embodiment of the present invention.

DESCRIPTION OF EMBODIMENTS OF THE INVENTION

Figure 1:
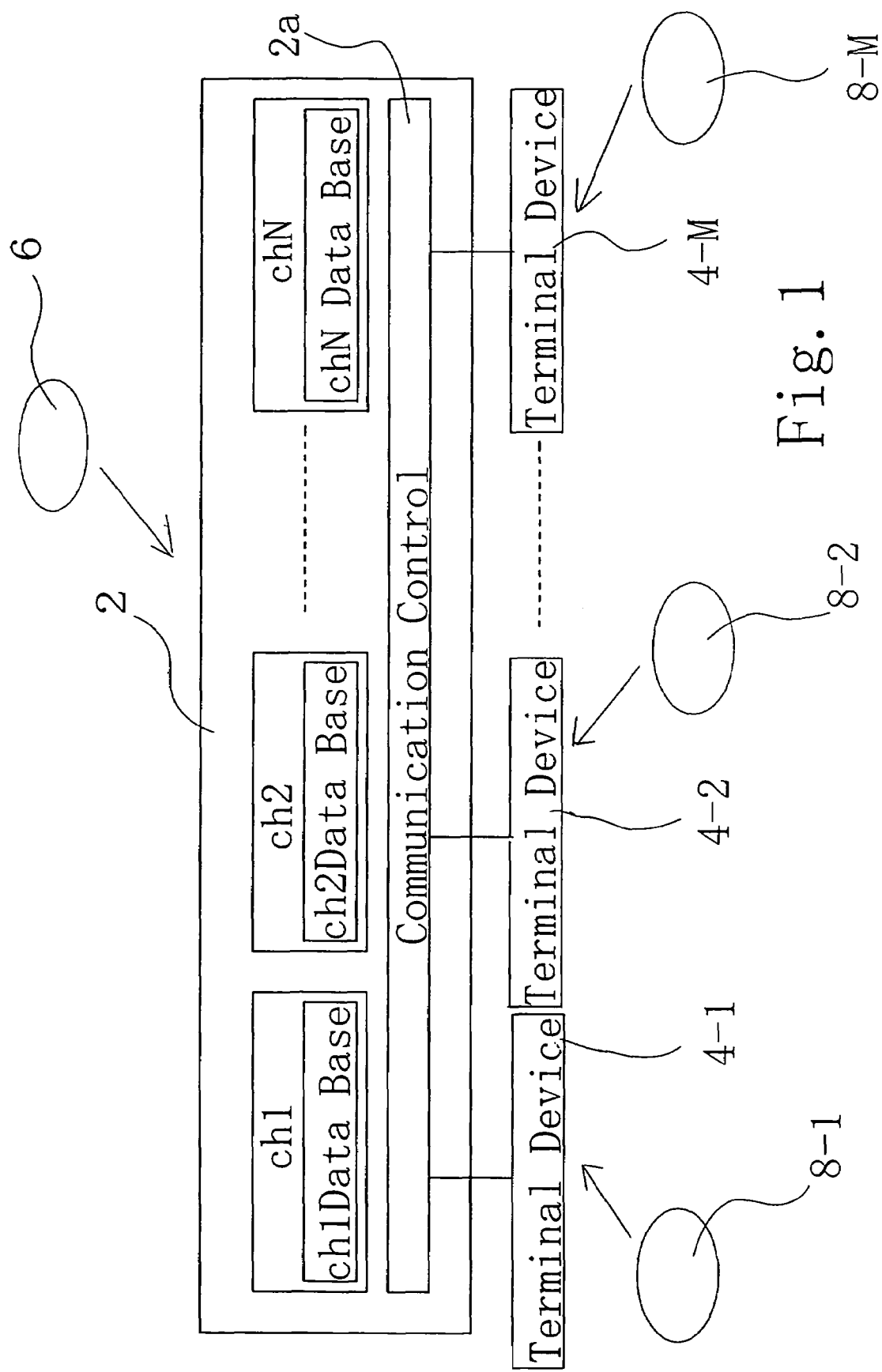
FIG. 1 is a block diagram of a chat system according to a first embodiment of the present invention.

As shown in FIG. 1, a chat system according a first embodiment of the present invention includes, for example, one server 2 and a plurality of terminal devices 4-1, 4-2, ..., 4-M, which form a network. (Hereinafter, the terminal devices 4-1, 4-2, ..., 4-M are sometimes referred to as terminal devices 4 collectively.) The server 2 and the terminal devices 4 may be computers, e.g. personal computers. Programs for operating the computers as the server 2 and the terminal devices 4 are provided by record mediums, e.g. CD-ROMs 6, 8-1, 8-2, ..., 8-M.

The server 2 and the terminal devices 4 form an Internet relay chat (IRC) system. In this IRC system, a plurality of virtual communication spaces, e.g. channels 1 through N, are formed in the server 2. Plural terminal devices are connected by a communication control unit 2a to any of the channels 1–N. Data transmitted from any of the terminal devices to the channel to which that terminal device is connected is transferred simultaneously to all of the terminals devices connected to that channel. Each of the terminal devices can be connected to a plurality of channels at a time.

Each of the channels 1–N includes a channel data base. The channel data base in each channel manages user information relating to users using the terminal devices connected to that channel. The user information includes, for example, identifiers of the users. Data sent from clients in any one of the channels are transferred to all of the terminal devices which are connected to that channel. Data sent from the server 2 to the terminal devices belonging to each channel contains an identifier of the user who transmitted a message, the message in the text form, channel information showing the channel through which the message is sent, etc. The terminal device that transmit the message also sends the identifier, the message and the channel information to the server 2.

Figure 2:
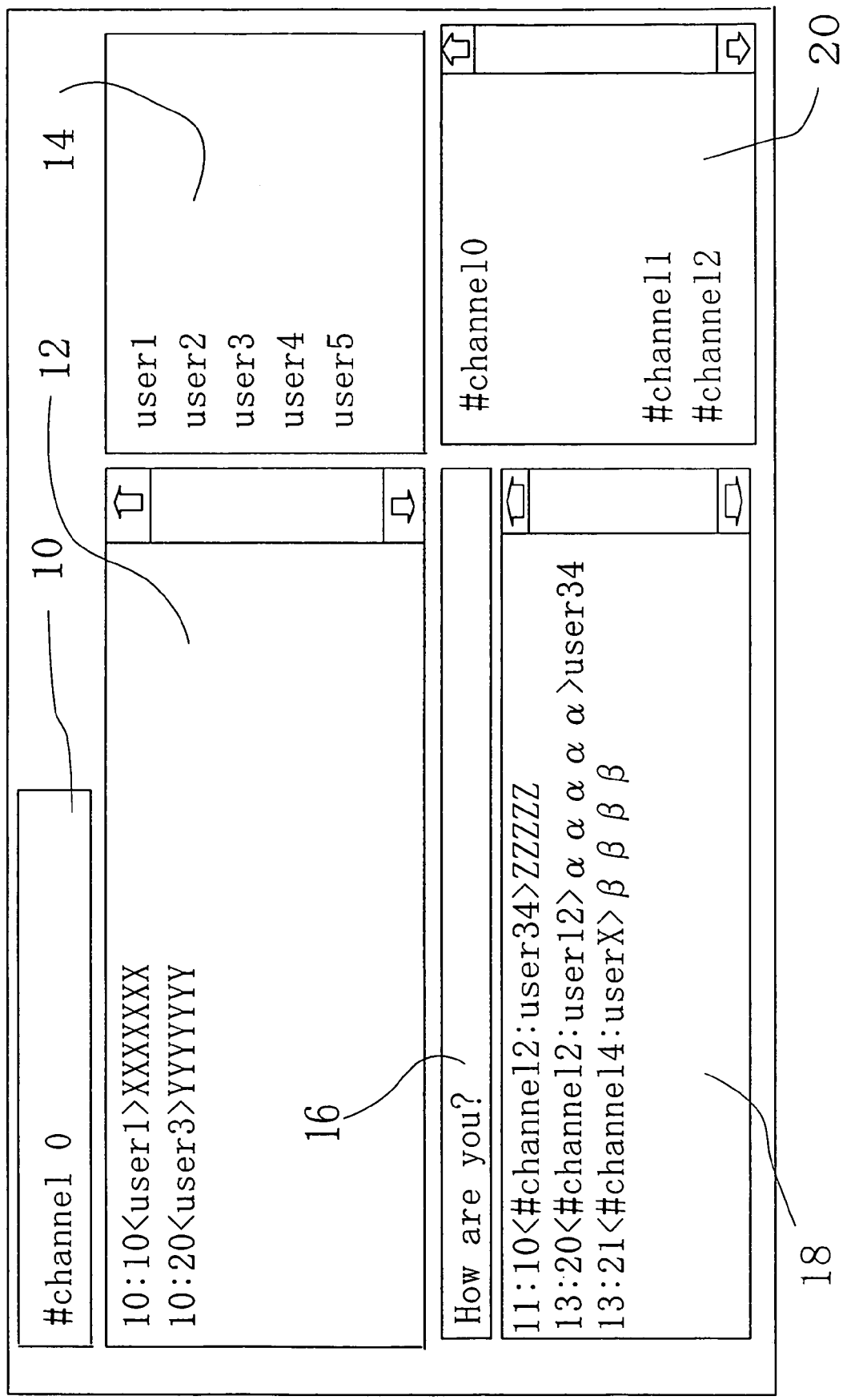
FIG. 2 is an example of display on a display device of a terminal device in the chat system of FIG. 1.

Each of the terminal devices 4 has a display device, and a window like the one shown in FIG. 2, for example, is displayed on the screen of the display device. The window contains a channel selector 10, a main window 12, a user window 14, a data input window 16, a sub-window 18, and a channel window 20. A channel to which that terminal device currently belongs or connected is displayed in the channel selector 10. In the main window, the messages sent through this channel are displayed in a time sequential manner in the main window 12. In the user window 14, the names of the users currently connected to the channel are displayed. The message the user of that terminal device is preparing for transmission is displayed in the data input window 16. The conversations exchanged in all of the other channels to which the user belongs and to which the user is not currently send any message are displayed in the sub-window 18. The channel window 20 are for displaying all the channels in which the user is currently participating.

In the main window 12, sets of letters "XXXXXXX" and "YYYYYY" represent messages in the text form. Each message is preceded by an identifier which indicates who sent the message displayed after it. The displayed identifier is the one sent from the message sender together with the message. In other words, the identifiers are used as sender identifying information. According to the present invention, the identifiers are converted into different character strings, e.g. "display names", before they are displayed. The display names are names adopted for the display purpose.

Let it be assumed that a company has set a customer channel and an in-house channel, and that a customer having an identifier "tom" connects to the customer channel, and there are two company employees having identifiers "ymat" and "pine", respectively. Let the following situations be assumed. The following conversation takes place in the customer channel.

<tom> I want to make a question.
<ymat> Yes, Sir?

<tom> I bought a personal computer sold by your company.
How can I upgrade the LAN card driver?
<ymat> May I have the model of the personal computer you bought?
<tom> The model number is 5113.

Then, the following conversation takes place in the in-house channel between the two employees.

<ymat> How can we provide a LAN card driver for customers?
<pine> It can be downloaded from our homepage.
<ymat> From where in our homepage can it be downloaded?
<pine> I myself will answer the customer.

Then, the employee <pine> answers the customer in the customer channel as follows.

<pine> We will send you a URL with which you can download the LAN card driver you need.

According to the present invention, the above-described conversations are displayed in the customer channel as follows.

<Customer> I want to make a question.
<Employee A> Yes, Sir?
<Customer> I bought a personal computer sold by your company. How can I upgrade the LAN card driver?
<Employee A> May I have the model of the personal computer you bought?
<Customer> The machine model number is 5113.
<Employee B> We will send you a URL with which you can download the LAN card driver you need.

With this display arrangement, the customer can chat without disclosing his or her nickname which contains more information about him or her than he or she being a customer. Also, the customer can avoid making a question to other customer in mistake for a company employee when plural customers and employees are talking in the customer channel. As the conversation advances, it is relatively easy for the customer to grasp the content of the information the company employees have given him or her. On the employees side, when different conversations are being made in parallel in the in-house and customer channels, possibility of inadvertently sending in-house information into the customer channel can be reduced by the use of different display names for different channels.

Because different display names can be used for different channels to which participants belong, speakers can express their own opinions, clearly understanding their own positions, and listeners can read the messages from the speakers, knowing the speakers' viewpoints.

In chatting, some people may worry that private information may be disclosed to participants who have been strangers until that time. It is more serious when they chat with an unspecified number of unknown people. For example, let it be assumed that the following conversations take place, and that the messages are displayed with identifiers of the speakers.

<nick1> Good evening!
<nick2> How do you do?
<nick7> I bought a personal computer recently.
<nick6> What model did you buy?

This conversation may be displayed as follows, in which the speakers' display names are displayed with the messages.

<Male1> Good evening!
<Male2> How do you do?
<Female7> I bought a personal computer recently.
<Female6> What model did you buy?

In this display, only part of attributes of the users or participants is displayed, which enables the participants to chat at ease more than when their identifiers are displayed.

Between participants, e.g. "nick1" and "nick7", who have built confidence in each other through the conversation, more of their attributes can be disclosed to each other. for example, as follows.

<New York Male1> Good evening?
<Male2> How do you do?
<Hawaii Female7> I bought a personal computer recently.
<Female6> What model did you buy?

It should be noted that this display of the conversation is available only on the display devices of "nick1" and "nick7", and "nick1" and "nick7" are displayed as they are on the display devices of the other participants.

Like this, by displaying the same contents only on the display devices of specific participants, the participants can recognize their conversations as ones held between reliable users.

Figure 3A:
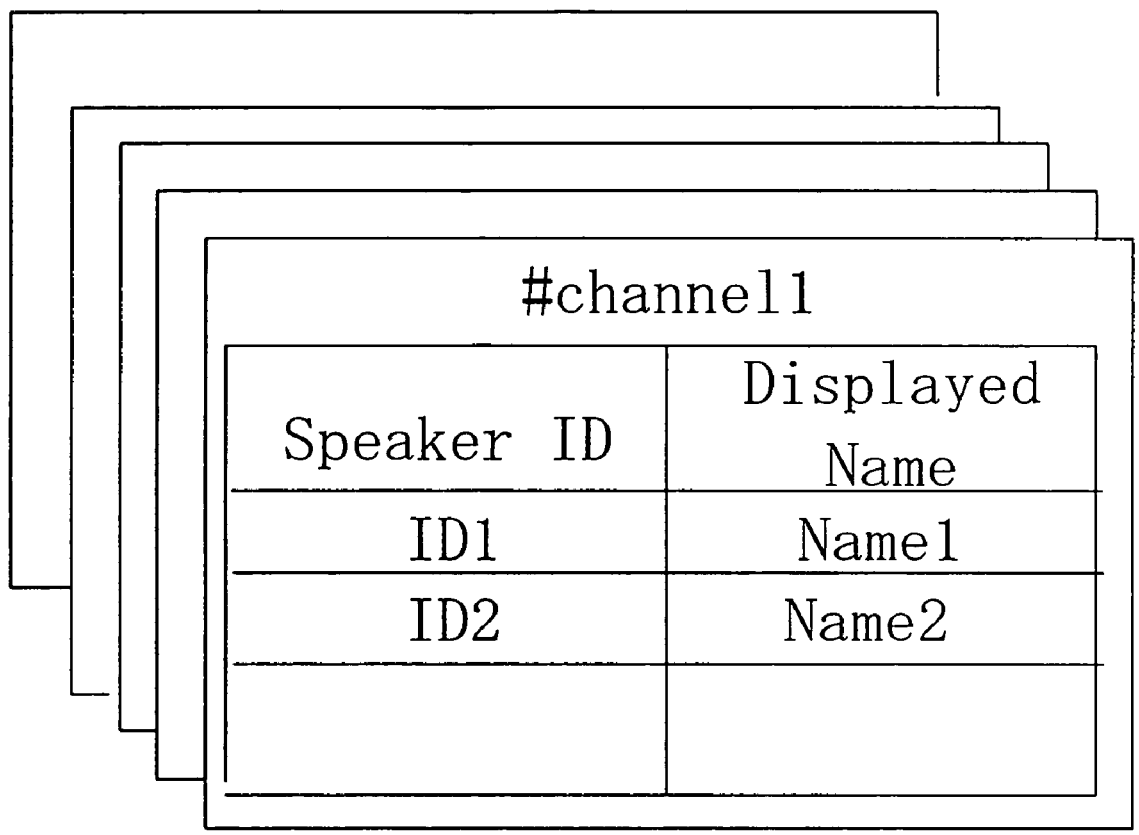
FIG. 3A a display name management table useable in the chat system shown in FIG. 1.

For this purpose, each of the channels in the server 2 is provided with table means, e.g. a display name management table 22, like the one shown in FIG. 3A. This table has stored therein the identifiers of the users who connect to that channel and the corresponding display names.

In stead of providing a display name management table for each of the channels, only one display name management table 22a like the one shown in FIG. 3B may be used, in which identifiers are shown in association with channels and display names. In the example shown in FIG. 3B, no channels are specified for an identifier ID1, and, therefore, a display name 1 is associated with the identified ID1 for all of the channels. A display name 2 is associated with an identifier ID2 for Channel 1, and a display name 3 is used for Channel 3. A display name 4 is used for the ID2 for the identifier ID1.

Figure 4:
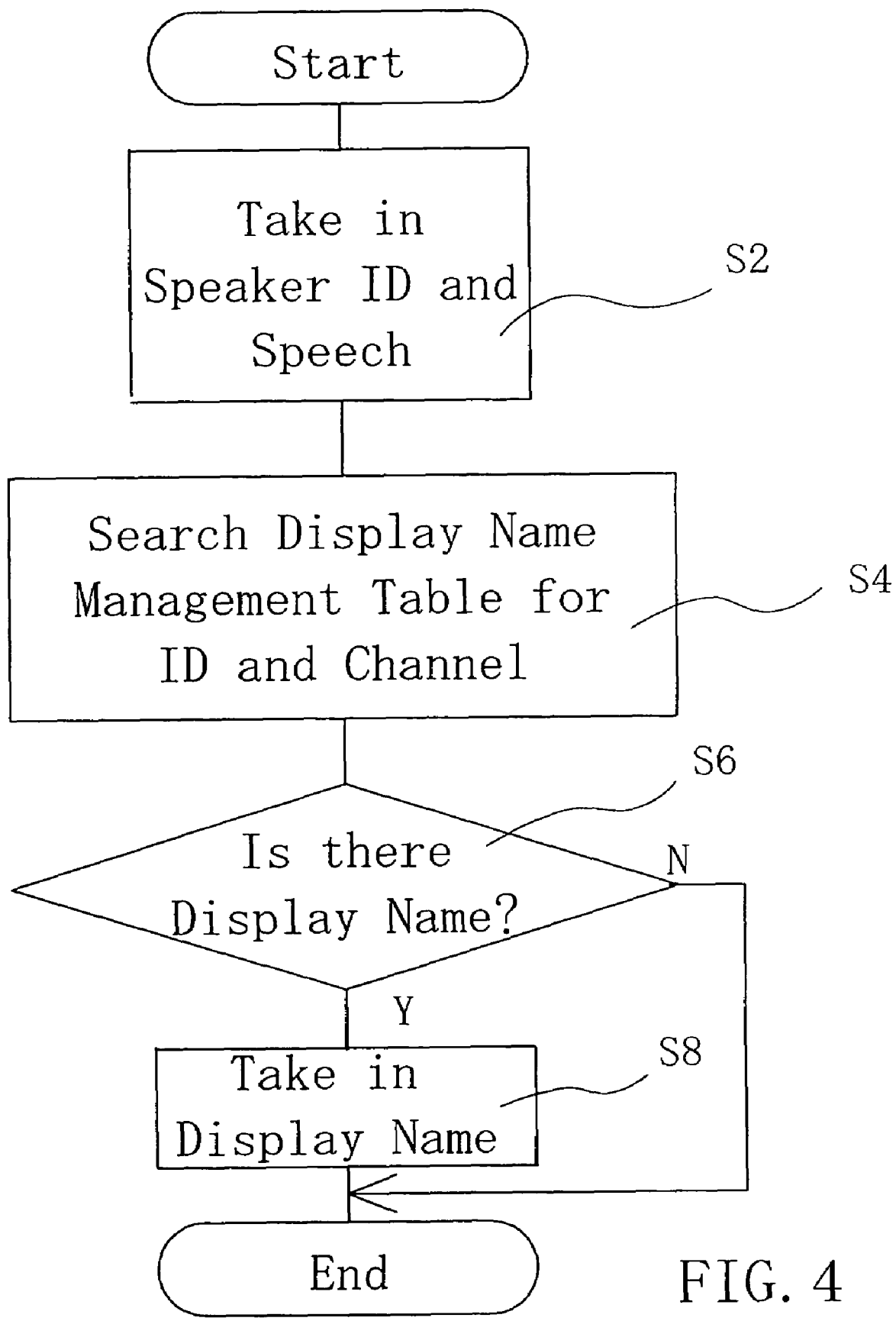
FIG. 4 is a flow chart of a display name determination sequence useable to determine a name to be displayed in the chat system shown in FIG. 1.

When the server 2 is provided with a table, e.g. the tables 22 shown in FIG. 3A, a display name determination sequence shown in FIG. 4 starts when the server 2 receives channel information, a message and an identifier from any of the terminal devices. In the sequence shown in FIG. 4, the server 2 takes in the identifier and channel information transmitted thereto (Step S2). Then, the management tables shown in FIG. 3A are searched for to find the management table 22 corresponding to the received channel information, and the management table 22 found is searched for any display name corresponding to the received identifier (Step S4). If any corresponding display name is found (YES in Step S6), the display name found is taken in (Step S8), and the display name determination sequence ends. If no corresponding display name is found, the sequence is ended.

When a display name is taken in, i.e. when an identifier is converted to a display name, the display name and the message are transmitted to the channel corresponding to the received channel information. The identifier may be transmitted, too, if necessary. If no display name has been given, the identifier and the associated message are sent to the channel corresponding to the received channel information.

When the display name management table shown in FIG. 3B is used, in Step S4 of the display name determination sequence, the table is searched for the received identifier. If the identifier is not found, the display determination sequence is ended through Step S6. If, on the other hand, the received identified is found in the table, whether or not any channel or user is associated with the identifier is determined (Step S6). If no channel or user is stored in association with the identifier, the display name corresponding to the received identifier is taken in (Step S8). If any channel is associated with the received identifier, whether or not the channel corresponding to the received channel information exist is determined. If the channel is present, the display name for that channel is taken in (Step S8). If there is no channel corresponding to the received channel information, whether or not there is a user corresponding to the received user information is determined. If there is, the display name for use for that user is taken in. If the received identifier is found in the table, but there is no channel or user corresponding to the received channel and user information, the display name determination sequence ends.

When a display name is taken in, i.e. when an identifier is converted to a display name, the display name and the message are transmitted to the channel corresponding to the received channel information. The identifier may be transmitted, too, if necessary. If a display name is not taken in, the identifier and the associated message are sent to the channel corresponding to the received channel information. If a particular display name is designated for a particular user, the server 2 sends the particular display name only to the particular user in the designated channel.

Figure 5:
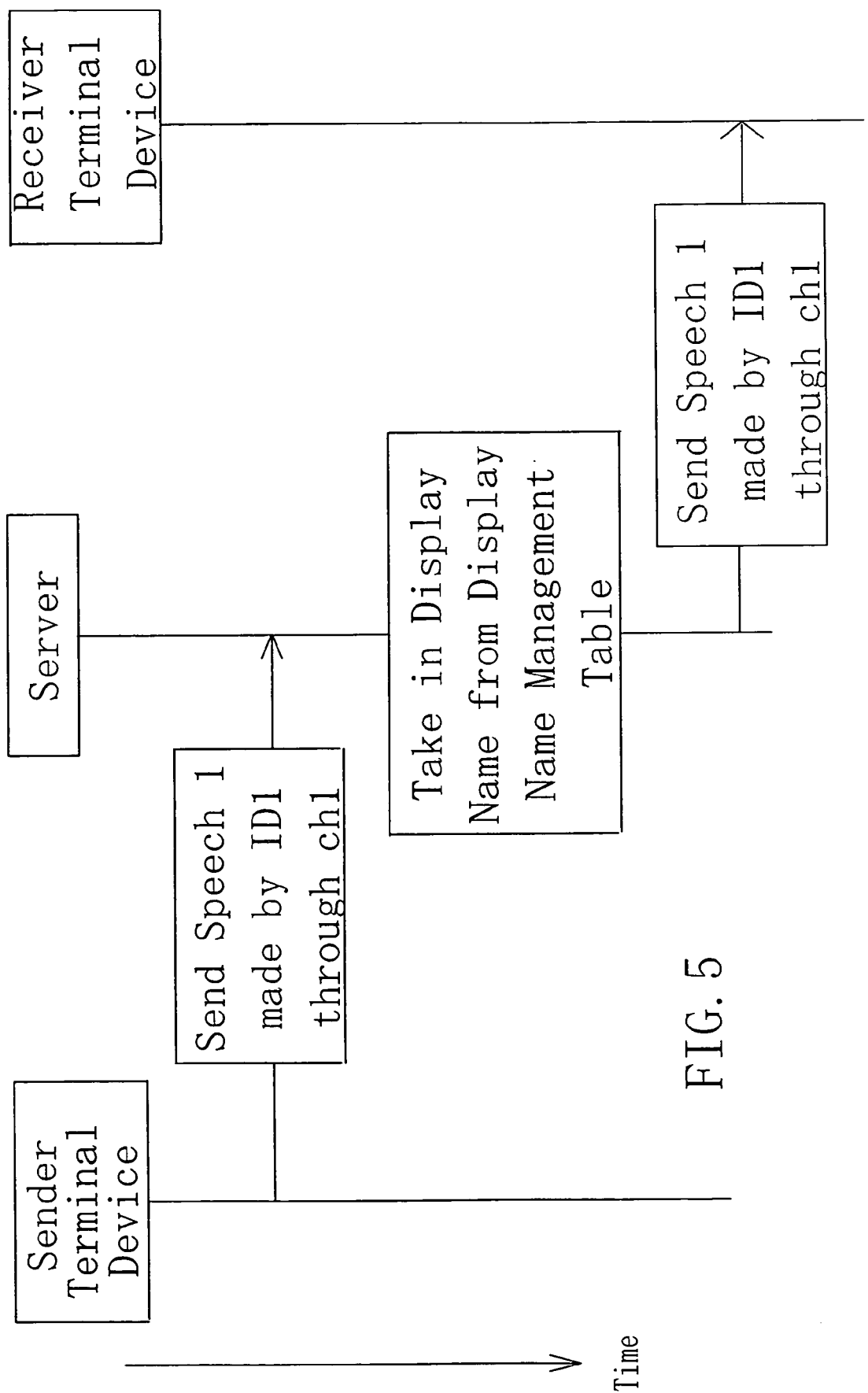
FIG. 5 illustrates a time sequence for determining a name to be displayed in the chat system of FIG. 1.

The time sequence in determining a display name in the server 2 is shown in FIG. 5. When the server 2 is provided with the display name management table, as described above, the display names can be handled all together in the server 2. This arrangement, therefore, is suitable in such a case that the display names of the users for all the channels and users are the same.

In stead of providing a display name management table in the server 2 and performing the display name determination sequence in the server 2 as described above, the display name determination sequence may be performed in each terminal device. Alternatively, the display name determining sequence may be performed in the terminal device through which a message is going to be transmitted. In this case, the display name determination sequence is activated when an identifier and a message are inputted. Alternatively, the display name determination sequence may be performed in the terminal devices receiving information. In this case, too, the display name determination sequence is activated when the identifier of the message sender and the message are inputted. Thus, the load on the server 2 can be reduced because the display name determination sequence is performed in the terminal devices.

In this case, however, the respective terminal devices must be provided with a copy of the display name management table. In addition, when the management table in the server 2 is updated, the copies of the management tables in the respective terminal devices must be updated, too.

Figure 6:
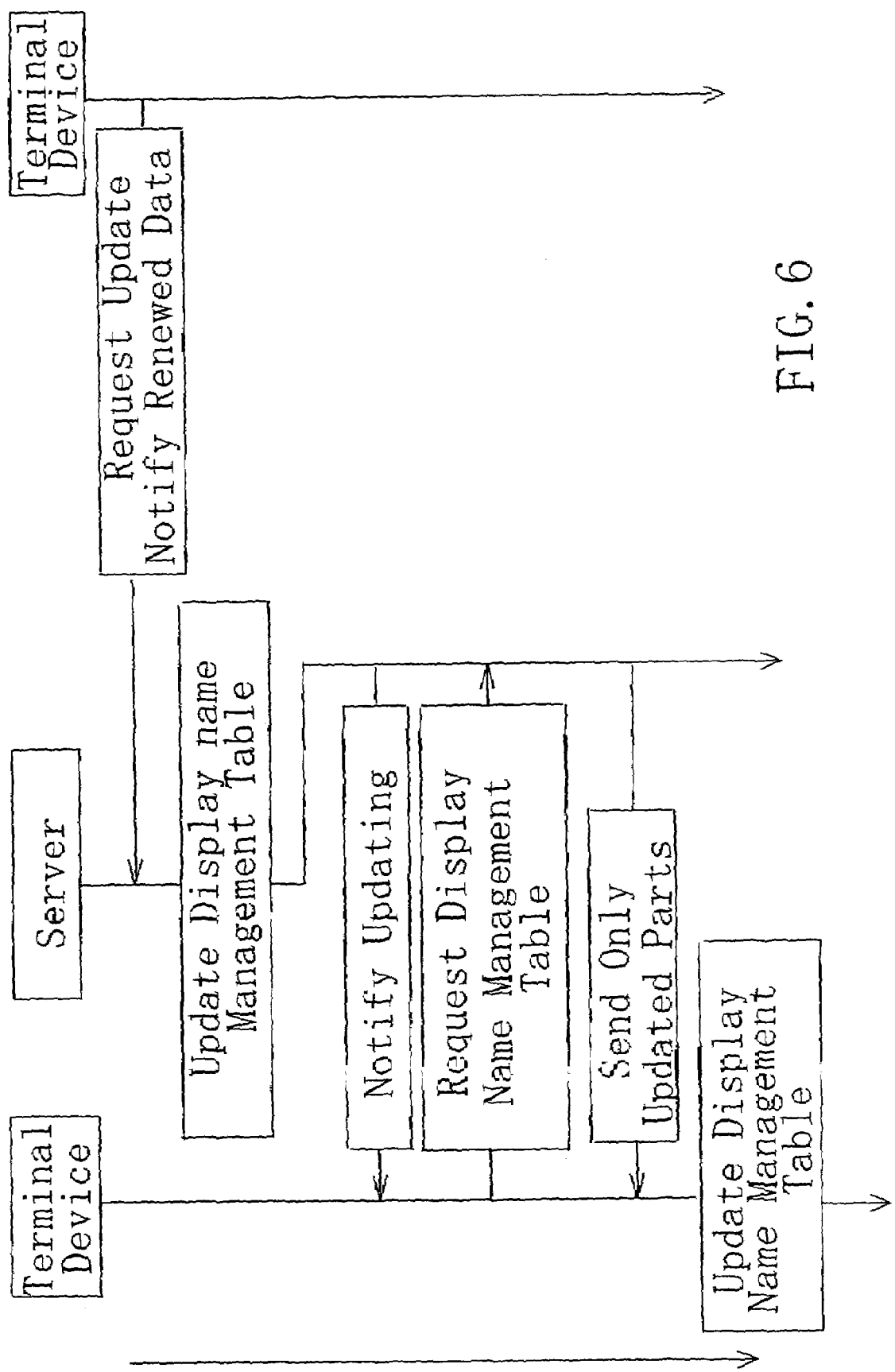
FIG. 6 illustrates a time sequence for synchronization for the display name management table in the chat system of FIG. 1.

For this purpose, a synchronization sequence shown in FIG. 6 is performed. When the server 2 is requested to update the display name and is informed of the renewed display name by any of the terminal devices, the updating of the management table is done. Upon completion of the updating, the server 2 notifies it to the respective terminal devices 4-1, 4-2, . . . , 4-M. The terminal devices 4 request the server 2 to send the display name management table, and the server 2 sends the updated parts of the management table to the terminal devices 4. Then, the terminal devices updates the copies of the display name management tables they have. The server 2 may send the entire management table to the terminal devices 4, instead.

In stead of providing a display name management table in the server 2, each of the terminal devices 4-1, 4-2, . . . , 4-M may be provided with a display name management table. In this case, the above-described synchronizing sequence is not necessary. The display name determination sequence is activated when a particular terminal device transmits or receives a message. This arrangement enables display names to be changed in a chat system without a server.

In the above-described examples, a character chain has been exemplified by a display name, but a URL or a mail address of a user may be used as exemplified below.

<http://mypage.com/Male1> Good evening!
<Male2> How do you do?
<mailto:mymail@mymail.com Female7> I bought a personal computer recently.
<Female6> What model did you buy?

According to a second embodiment of the invention, the server 2 is provided with a speech log management table 24 like the one shown in FIG. 7 for each of the channels. The speech log table 24 contains rows of information recorded therein. Each row includes an identifier of a speaker, a time when the speaker sends a message and the message itself. The rows are arranged on the time basis. Using this speech log management table 24 and the previously described display name management table, identifiers can be converted into display names in batch.

For example, let it be assumed that a discussion is held in the chat system, and the following speeches are displayed in the main window 12 (FIG. 2) on the time basis.

<user1> Speech 1
<user2> Speech 2
<user3> Speech 3
<user4> Speech 4
<user5> Speech 5
<user6> Speech 6
<user7> Speech 7
<user8> Speech 8

Further, let it be assumed that the user is permitted to selectively use "pro" or "con". When the identifiers are batch-converted at a particular time, the following speech log is displayed.

<Pro> Speech 1
<Con> Speech 2
<Pro> Speech 3
<Pro> Speech 4
<Pro> Speech 5
<Con> Speech 6
<Pro> Speech 7
<Pro> Speech 8

The batch-conversion of the display can reveal that there are few cons. Like this, by changing the identifiers associated with the speeches or messages that have been spoken in a particular channel, one can know the trend or mood of the conversation that has been had.

Figure 8:
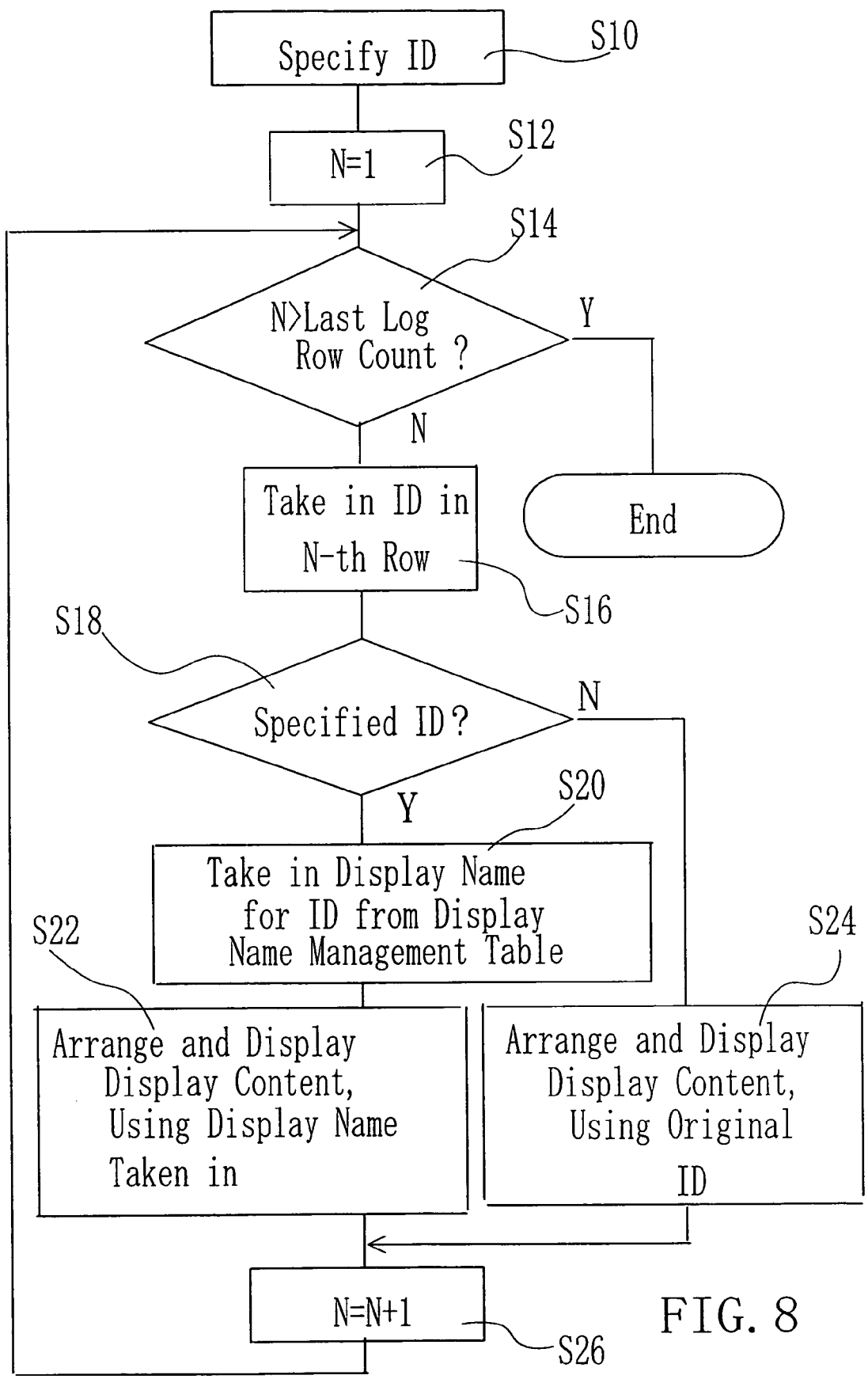
FIG. 8 is a flow chart of a sequence for batch conversion of display names useable in the second embodiment.

For this purpose, a display name batch-conversion sequence like the one shown in FIG. 8 is carried out in the server 2. The display name management table contains the identifiers and corresponding display names of the user who are participating in the channel in which the discussion is being held. First, the identifier to be converted into its corresponding display name is specified (Step S10). Then, the count N in a log row counter is set to 1 (Step S12). Whether or not the count N in the log row counter is larger than the count representative of the last log row is judged (Step S14). If the count N in the counter is not larger than the last log row count, the identifier contained in the row corresponding to the count N in the counter is taken in (Step S16). Then, whether the identifier taken in is the specified identifier or not is judged (Step S18). If it is, the display name corresponding to the identifier taken in is taken in (Step S20). Then, using the display name taken in, the display in the main window 12 on the display device of each of the terminal devices belonging to the channel are re-arranged (Step S22).

If it is known in Step S14 that the count N in the counter is larger than the last log row representative count, the display name batch conversion sequence is terminated.

If the identifier taken in is judged not to be the specified identifier in Step S18, the original identifier is used to re-arrange the display in the main window 12 on the display device of each of the terminal devices belonging to the channel (Step S24). After the execution of Step S18 or S22, the count N in the counter is incremented by 1 (Step S26), and the sequence returns to Step S14. Similar procedures are followed for other identifiers for batch conversion.

In stead of carrying out the display name batch-conversion sequence in the server 2, it may be arranged that each terminal device performs the sequence. In such a case, each terminal device may be provided with a speech log management table or its copy.

What is claimed is:

1. A chat system comprising:
    a plurality of terminal devices forming a network, said terminal devices being adapted to transmit and receive messages to and from each other through any of a plurality of virtual communication spaces configured on the network, the messages transmitted and received being displayed on respective displays of the terminal devices together with message sender identifying information of persons who sent the messages;
    means for associating a designated identifier of a person with a virtual communication space identifier to determine character-train information usable as a message sender identifier for the person in the virtual communication space; and
    a table storing therein, in association with each other, the identifier of the person using said virtual communication spaces, the identifier of said virtual communication space and the corresponding character-train information of the person; and wherein said table stores different character-train information for the identifier of a given person for use in respective, different ones of said virtual communication spaces.

2. The chat system according to claim 1, wherein said table stores different character-train information for the identifier of a given person for use in communications with respective, different persons.

3. The chat system according to claim 1, wherein said plurality of terminal devices use said table in common.

4. The chat system according to claim 1, wherein the character-train information stored in said table is accessible from said respective terminal devices.

5. The chat system according to claim 1, wherein character-train information to be stored in said table is sent through terminal devices from which said messages are transmitted.

6. The chat system according to claim 1, wherein said network is formed of said plurality of terminal devices and a server, and character-train information to be stored in said table is set in said server.

7. The chat system according to claim 1 wherein said message sender identifier is converted into the character-train information at the terminal device which receives the message.

8. A chat system, comprising:
    a server;
    a plurality of terminal devices each having a display and forming a network with said server, said terminal devices being adapted to transmit and receive messages to and from each other through any of a plurality of virtual communication spaces configured on the network, the messages transmitted and received being displayed on the display of each terminal device together with message sender identifying information of persons who send the messages;
    a search device disposed in said server and searching said table for character-train information corresponding to the identifier of a message sender when said server receives said identifier of the message sender and a message from said message sender, for transferring said character-train information together with said message, wherein said search means associates a designated identifier of a person with a virtual communication space identifier to determine character-train information usable as a message sender identifier for the person in the virtual communication space; and
    a table storing therein, in association with each other, the identifier of the person using said virtual communication spaces, the identifier of said virtual communication space and the corresponding character-train information of the person; and wherein said table stores different character-train information for the identifier of a given person for use in respective, different ones of said virtual communication spaces.

9. The chat system according to claim 8 wherein said sender identifier and message are transmitted through a designated one of said virtual communication spaces;
    said table has stored therein different character-train information for the respective ones of said sender identifiers for use in different ones of said virtual communication spaces; and
    said search means searches said table for the character-train corresponding to the designated virtual communication space and sender identifier.

10. The chat system according to claim 8 wherein said sender identifiers with messages are transmitted with receivers of said messages designated; said table has stored therein said identifiers and corresponding character-train information for respective message receivers; and said search means searches for the character-train information corresponding to the message sender and the message receiver.

11. A chat system comprising:
    a server;
    a plurality of terminal devices having corresponding displays and forming a network with said server, said terminal devices being adapted to transmit and receive messages to and from each ether through any of a plurality of virtual communication spaces configured on the network, the messages transmitted and received being displayed on the display of each terminal device together with message sender identifying information of persons who send the messages;
    search means disposed in each of said terminal devices for searching said table for character-train information corresponding to the identifier of a message sender when the terminal device receives said identifier of the message sender and a message from said message sender, so that the character-train information is displayed together with the received message on said display means of said terminal device, wherein said search means associates a designated identifier of a person with a virtual communication space identifier to determine character-train information usable as a message sender identifier for the person in the virtual communication space; and a table storing therein, in association with each other, the identifier of the person using said virtual communication spaces, the identifier of said virtual communication space and the corresponding character-train information of the person; and wherein said table stores different character-train information for the identifier of a given person for use in respective, different ones of said virtual communication spaces.

12. A chat system comprising:
a server;
a plurality of terminal devices having corresponding displays forming a network with said server, said terminal devices being adapted to transmit and receive messages to and from each other through any of a plurality of virtual communication spaces configured on the network, the messages transmitted and received being displayed on the display of each terminal device together with message sender identifying information of persons who send the messages;
search means disposed in each of said terminal devices for searching said table for character-train information corresponding to the identifier of a message sender when the terminal device transmits said identifier so that the character-train information is transmitted together with the message, wherein said search means associates a designated identifier of a person with a virtual communication space identifier to determine character-train information usable as a message sender identifier for the person in the virtual communication space; and
a table storing therein, in association with each other, the identifier of the person using said virtual communication spaces, the identifier of said virtual communication space and the corresponding character-train information of the person; and wherein said table stores different character-train information for the identifier of a given person for use in respective, different ones of said virtual communicaton spaces.

13. The chat system according to claim 11, wherein:
said sender identifier and message are transmitted through a designated one of said virtual communication spaces;
said table has stored therein different character-train information for the respective ones of said identifiers for use in different ones of said virtual communication spaces; and
said search means searches said table for the character-train corresponding to the designated virtual communication space and sender identifier.

14. The chat system according to claim 12, wherein:
said sender identifier and message are transmitted through a designated one of said virtual communication spaces;
said table has stored therein different character-train information for the respective ones of said identifiers for use in different ones of said virtual communication spaces; and
said search means searches said table for the character-train corresponding to the designated virtual communication space and identifier.

15. The chat system according to claim 11, wherein:
said sender identifiers with messages are transmitted with receivers of said messages designated;
said table has stored therein said identifiers and corresponding character-train information for respective message receivers; and
said search means searches for the character-train information corresponding to the message sender and the message receiver.

16. The chat system according to claim 12, wherein:
said sender identifiers with messages are transmitted with receivers of said messages designated;
said table has stored therein said identifiers and corresponding character-train information for respective message receivers; and
said search means searches for the character-train information corresponding to the message sender and the message receiver.

17. A record medium for use in and readable by a terminal device of a chat system, wherein a plurality of terminal devices form with a server a network, said terminal devices being adapted to transmit and receive messages to and from each other through any of a plurality of virtual communication spaces configured on the network, the messages transmitted and received being displayed on a display of each terminal device together with message sender identifying information of persons who send the messages, said record medium comprising:
search means for searching said table for character-train information corresponding to the identifier of a person who is going to send a message and outputting the character-train information sought, as said message sender identifying information, for transmission with said message, wherein said search means associates a designated identifier of a person with a virtual communication space identifier to determine character-train information usable as a message sender identifier for the eerson in the virtual communication space; and
a table storing therein, in association with each other, the identifier of the person using said virtual communication spaces, the identifier of said virtual communication space and the corresponding character-train information of the person; and wherein said table stores different character-train information for the identifier of a given person for use in respective, different ones of said virtual communicaton spaces.

18. The record medium according to claim 17, wherein:
said identifier and a message of a message sender are transmitted through a designated one of said virtual communication spaces;
said table has stored therein different character-train information for the respective ones of said identifiers for use in different ones of said virtual communication spaces; and
said search means searches said table for the character-train corresponding to the designated virtual communication space and the identifier of said message sender.

19. The record medium according to claim 17 wherein:
the identifier and a message of a message sender are transmitted with receivers of said message designated;
said table has stored therein said identifiers and character-train information corresponding to said identifiers to be used in relation to respective message receivers; and
said search means searches for the character-train information corresponding to the message sender and the message receiver.

20. A record medium for use in and readable by a terminal device of a chat system, wherein a plurality of terminal devices form a network, said terminal devices being adapted to transmit and receive messages to and from each other through any of a plurality of virtual communication spaces configured on the network, the messages transmitted and received being displayed on a display of each terminal device together with message sender identifying information of persons who send the messages said record medium comprising:

search means for searching said table for character-train information corresponding to the identifier of the message sender received through the virtual communication spaces and outputting the character-train information, as said message sender identifying information, for display on said display, wherein said search means associates a designated identifier of a person with a virtual communication space identifier to determine character-train information usable as a message sender identifier for the person in the virtual communication space; and a table storing therein, in association with each other, the identifier of the person using said virtual communication spaces, the identifier of said virtual communication space and the corresponding character-train information of the person; and wherein said table stores different character-train information for the identifier of a given person for use in respective, different ones of said virtual communicaton spaces.

21. The record medium according to claim 20, wherein:

said identifier and a message of a message sender are transmitted through a designated one of said virtual communication spaces;

said table has stored therein different character-train information for said identifiers for use in different ones of said virtual communication spaces; and said search means searches said table for the character-train corresponding to the designated virtual communication space and the identifier of said message sender.

22. The record medium according to claim 20, wherein:

the identifier and a message of a message sender are transmitted with receivers of said message designated;

said table has stored therein said identifiers and character-train information corresponding to said identifiers to be used in relation to respective message receivers; and said search means searches for the character-train information corresponding to the message sender and the message receiver.

23. A record medium for use by and readable in a server of a chat system, wherein said server forms a network with a plurality of terminal devices, said server being adapted to allow said plurality of terminal devices to transmit and receive messages to and from each other through any of a plurality of virtual communication spaces configured on the network, the messages transmitted and received being displayed on display means of each terminal device together with message sender identifying information of persons who send the messages, said record medium comprising:

converting means for searching said table for character-train information corresponding to the identifier of the message sender sent together with a message by any of said terminal devices and outputting the character-train information for sending it together with said message to a given virtual communication space, wherein said converting means associates a designated identifier of a person with a virtual communication space identifier to determine character-train information usable as a message sender identifier for the person in the virtual communication space; and a table storing therein, in association with each other, the identifier of the person using said virtual communication spaces, the identifier of said virtual communication space and the corresponding character-train information of the person; and wherein said table stores different character-train information for the identifier of a given person for use in respective, different ones of said virtual communicaton spaces.

24. The record medium according to claim 23, wherein:

said identifier and a message of a message sender are transmitted through a designated one of said virtual communication spaces;

said table has stored therein different character-train information for said identifiers for use in different ones of said virtual communication spaces; and said search means searches said table for the character-train corresponding to the designated virtual communication space and the identifier of said message sender.

25. The record medium according to claim 23, wherein:

the identifier and a message of a message sender are transmitted with receivers of said message designated;

said table has stored therein said identifiers and character-train information corresponding to said identifiers to be used in relation to respective message receivers; and said search means searches for the character-train information corresponding to the message sender and the message receiver.

26. A chat system, comprising:

a plurality of terminal devices forming a network, said terminal devices being adapted to transmit and receive messages to and from each other through any of a plurality of virtual communication spaces configured on the network, the messages transmitted and received being displayed on a display of each terminal device together with message sender identifying information of persons who send the messages;

a memory having stored therein messages in association with identifiers of persons using said terminal devices;

converting means for converting a designated one of said identifiers of the persons stored in said memory to a predetermined character train and causing said display to display the character train, wherein said converting means associates a designated identifier of a person with a virtual communication space identifier to determine character-train information usable as a message sender identifier for the person in the virtual communication space; and a table storing therein, in association with each other, the identifier of the person using said virtual communication spaces, the identifier of said virtual communication space and the corresponding character-train information of the person; and wherein said table stores different character-train information for the identifier of a given person for use in respective, different ones of said virtual communicaton spaces.

27. The chat system according to claim 26, wherein:

said network comprises a plurality of terminal devices and one server, and said memory is provided in said server.

28. The chat system according to claim 26, wherein:

said memory is provided in each of said terminal devices.

29. The chat system according to claim 28, wherein:

said converting means is provided in each of said terminal devices.

* * * * *

UNITED STATES PATENT AND TRADEMARK OFFICE
CERTIFICATE OF CORRECTION

PATENT NO.        : 7,185,055 B2
APPLICATION NO.   : 09/804246
DATED             : February 27, 2007
INVENTOR(S)       : Yasuhide Matsumoto et al.

It is certified that error appears in the above-identified patent and that said Letters Patent is hereby corrected as shown below:

Column 10, Line 49, change "ether" to --other--.

Column 11, Line 38, change "communicaton" to --communication--.

Column 12, Line 29, change "eerson" to --person--.

Column 12, Line 37, change "communicaton" to --communication--.

Column 12, Line 49, after "claim 17" insert --,--.

Column 13, Line 19, change "communicaton" to --communication--.

Column 14, Line 5, change "communicaton" to --communication--.

Column 14, Line 52, change "communicaton" to --communication--.

Signed and Sealed this

Third Day of July, 2007

JON W. DUDAS
*Director of the United States Patent and Trademark Office*